United States Patent
Wyman et al.

(10) Patent No.: US 11,539,301 B2
(45) Date of Patent: Dec. 27, 2022

(54) HYBRID BIDIRECTIONAL DC TO DC CONVERTER

(71) Applicant: Combined Energies LLC, Latham, NY (US)

(72) Inventors: Mark Robert Wyman, East Bloomfield, NY (US); Fan Liu, West Henrietta, NY (US); John Anthony Vogel, Latham, NY (US)

(73) Assignee: Combined Energies, LLC, Latham, NY (US)

( * ) Notice: Subject to any disclaimer, the term of this patent is extended or adjusted under 35 U.S.C. 154(b) by 0 days.

(21) Appl. No.: 17/631,017

(22) PCT Filed: Jul. 29, 2020

(86) PCT No.: PCT/US2020/070322
§ 371 (c)(1),
(2) Date: Jan. 28, 2022

(87) PCT Pub. No.: WO2021/022297
PCT Pub. Date: Feb. 4, 2021

(65) Prior Publication Data
US 2022/0271680 A1    Aug. 25, 2022

Related U.S. Application Data

(60) Provisional application No. 62/879,745, filed on Jul. 29, 2017.

(51) Int. Cl.
*H02M 3/335* (2006.01)
*H02M 1/00* (2006.01)

(52) U.S. Cl.
CPC ..... *H02M 3/33584* (2013.01); *H02M 1/0077* (2021.05)

(58) Field of Classification Search
CPC ............ H02M 3/335; H02M 3/33584; H02M 3/33569; H02M 3/33576; H02M 3/3376; H02M 1/0077
See application file for complete search history.

(56) References Cited

U.S. PATENT DOCUMENTS 7,518,886 B1    4/2009  Lai et al.
11,088,625 B1 *  8/2021  Cao ................... H02M 3/33584
(Continued)

OTHER PUBLICATIONS

Young, "Written Opinion of the International Searching Authority", regarding PCT App. No. PCT/US20/070322., dated Jul. 29, 2020.

*Primary Examiner* — Adolf D Berhane
(74) *Attorney, Agent, or Firm* — STGIP, LLC; Shawn Gordon

(57) ABSTRACT

A hybrid bidirectional DC to DC converter allows a direct boost ratio in the high voltage to low voltage direction, but not in the low to high direction. Switches are used to tie the commons of the transformers to ground and power rail to allow the formation of a full-bridge with remaining phases to alter the boost ratio so that transformers do not need to be connected in series in the high voltage to low voltage direction. The switches are on a connection shared by the transformers and are configured to allow a dynamic change-over of the secondary windings in a multi-phase delta-wye configuration from a series nature into a parallel nature such that a 2× boost of winding ratio is reduced to a 1× boost of winding ratio depending on whether the input voltage is above or below a threshold input voltage.

12 Claims, 4 Drawing Sheets

(56) References Cited

U.S. PATENT DOCUMENTS

| | | |
|---|---|---|
| 2008/0084714 A1 | 4/2008 | Kawasaki et al. |
| 2013/0234669 A1 | 9/2013 | Huang et al. |
| 2013/0322128 A1 | 12/2013 | Takegami |
| 2013/0328539 A1 | 12/2013 | King et al. |
| 2016/0261205 A1 | 9/2016 | Kolar |
| 2020/0044572 A1* | 2/2020 | Bouchez ........... H02M 3/33584 |

* cited by examiner

US 11,539,301 B2

HYBRID BIDIRECTIONAL DC TO DC CONVERTER

FIELD OF THE INVENTION

The present invention generally relates to the field of power electronics. In particular, the present invention is directed to a hybrid bidirectional DC to DC converter.

BACKGROUND

A bidirectional DC to DC converter allows electrical power to flow in both directions in a circuit, which may be useful for situations in which, for example, a battery will serve as a source of power at certain times and as a receiver of power to store at other times. For example, a battery may be charged by a wind turbine while the wind is blowing and/or by a solar panel array when the sun is shining, and then provide power to a load when the wind is not blowing (for wind turbines) or when the sun is not shining (for solar arrays).

A DC to DC converter includes transformers with windings that determine the boost ratio or reduction ratio of voltages across the converter. Generally, in a bidirectional DC to DC converter, the boost ratio in the forward direction is the same as the reduction ratio in the reverse (or buck) direction. For some applications, however, this equivalency may be undesirable.

Voltage requirements on many applications that are powered through a bidirectional DC to DC converter, such as vehicles, are increasing because the materials/components of the applications are getting smaller and may also be including more features that require power. Therefore, a high boost may be needed for energy from certain types of generators, especially when the generators are near end of life (e.g., for fuel cells) or operating at low capacity (e.g., low light for solar or light winds for turbines). However, for the same applications and/or generators, a high boost is not always needed or desirable, such as when the generator is producing more energy. In these circumstances, a high boost may be needlessly inefficient or result in such high voltages that components would have to be rated for impractical operating conditions.

SUMMARY OF THE DISCLOSURE

A system for a hybrid bidirectional DC to DC converter is provided that has a high voltage to low voltage direction and a low voltage to high voltage direction. The converter includes a plurality of transformers, each of the plurality of transformers having a secondary winding, a plurality of switches, wherein a one of the plurality of switches is between a respective one of each of the plurality of transformers and a low voltage side of the converter and wherein another one of the plurality of switches is between a respective one of each of the plurality of transformers and a high voltage side of the converter. At least two additional switches are included on a connection shared by the plurality of transformers, the additional switches configured to allow a dynamic switchover from a series nature of secondary windings in a multi-phase delta-wye configuration into a parallel nature of the secondary windings such that a 2× boost of winding ratio is reduced to a 1× boost of winding ratio.

Additionally or alternatively, the two additional switches tie a commons of the plurality of transformers to ground and a power rail to form a full-bridge with remaining phases when closed.

Additionally or alternatively, the two additional switches are closed when the converter is operating in the high voltage to low voltage direction and a detected input voltage on a high voltage side of the converter is below a threshold input voltage.

Additionally or alternatively, the two additional switches are open when the detected input voltage on a high voltage side of the converter is above a threshold input voltage.

Additionally or alternatively, the two additional switches are open when the converter is operating in the low voltage to high voltage direction.

Additionally or alternatively, the plurality of transformers includes three transformers and wherein each of the three transformers has a boost ratio between 1:1.5 and 1:10.

Additionally or alternatively, the threshold input voltage is between 10 VDC and 500 VDC.

Additionally or alternatively, the at least two additional switches are field effect transistor switches.

A method for adjusting a boost ratio across a bidirectional DC to DC converter having a high voltage to low voltage direction and a low voltage to high voltage direction is provided that includes determining whether the converter is operating in a forward or reverse direction, and, when the converter is operating in the forward direction, opening a pair of FET switches that tie a commons of a plurality of transformers in the converter to ground and a power rail to form a full-bridge with remaining phases when closed. When the converter is operating in the reverse direction, an input voltage on a high side of the converter is determined and the determined input voltage is compared to a threshold input voltage. When the determined input voltage is greater than the threshold input voltage, the pair of FET switches are closed and when the determined input voltage is less than the threshold input voltage, the pair of FET switches are opened.

Additionally or alternatively, the threshold input voltage is 80 VDC.

Additionally or alternatively, closing the pair of FET switches causes a dynamic switchover from a series nature of secondary windings in a multi-phase delta-wye configuration into a parallel nature of the secondary windings such that a 2× boost of winding ratio is reduced to a 1× boost of winding ratio.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

For many applications, an adjustable boost ratio for DC to DC converters would be desirable. The windings in transformers are not practical to adjust after the transformers have been made, so adjusting the boost ratio by swapping windings is not usually a viable option. There is a need, then, for a bidirectional DC to DC converter with an adjustable boost ratio.

A hybrid DC to DC converter is provided in which the boost ratio is adjustable depending on the boost direction and/or boost requirements based on detected input voltages from either the low voltage side or the high voltage side of the converter.

In a DC to DC converter, the boost ratio can be doubled by interleaving the transformers. This interleaving can be decoupled such that only half as much boost is gained when a high boost is not needed. The decoupling may be linked to a software switch based on the sensing of input voltage and other parameters, as discussed in more detail below.

A DC to DC converter with a delta-wye configuration of transformers is well suited for large ratio boosts in voltages because in this configuration the ratio of windings of the transformers are added together, resulting in a doubling of the boost ratio. In the reverse direction, however, this large boost ratio functions to divide the voltages by the same large ratio, which may result in voltages that are too low to provide required outputs for some applications. If a converter with a delta-wye transformer configuration is used in this situation, the high-voltage side may have to pre-boost the voltage to attain the desired outputs, which tends to be inefficient.

For example, if in a DC to DC converter a 1:9 ratio was used for boost in the low to high direction, then in the high to low direction, to get 135V nominal output, the high voltage side of the transformers would need to enter at a minimum of 1250V (i.e., 135V×9). In addition, if significant boost is not necessary in the low to high direction, for example when input is 135V nominal and the output is set for 350V, the needed boost ratio is only 2.6:1.

Figure 1:
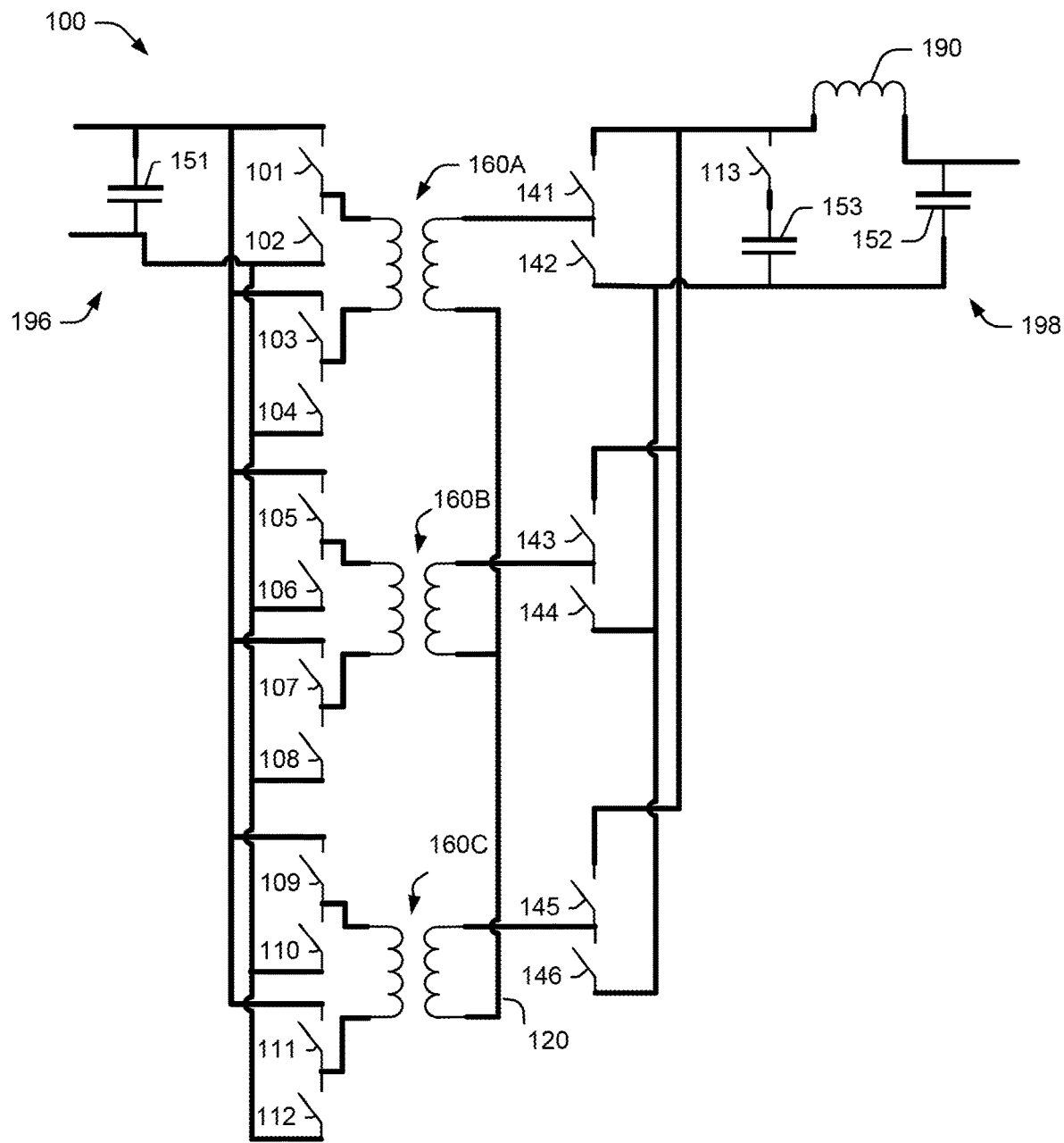
FIG. 1 is a circuit diagram showing a prior art converter having a delta-wye transformer configuration for providing a high boost ratio.

A converter 100 is shown in FIG. 1 (prior art) and includes a capacitor 151 on a low voltage side 196 and transformers 160 (e.g., 160A-160C) between low voltage side 196 and high voltage side 198. High voltage side 198 includes an inductor 190 positioned between a first capacitor 152 and a second capacitor 153, with a switch 113 on one side of capacitor 153. Pairs of switches (e.g., 141-142, 143-144, 145-146) are located between one end of each of respective transformers 160 and high voltage side 198. On low voltage side 196, pairs of switches (e.g., 101-102, 103-104, 105-106, 107-108, 109-110, and 111-112) are located between each end of each transformer 160 and low voltage side 196.

If, for example, the transformer turns ratio is designed to be 1:3.3, as in converter 100 with a delta-wye transformer configuration shown in FIG. 1, rather than 1:5, then boosting the high voltage side 198 becomes less necessary, but the lowest voltage that can be input on the low voltage side 196 and be boosted to a sufficiently high voltage output is limited. Although transformers 160 have 1:3.3 transformer turns ratios, in this configuration the result will be a 1:6.6 boost ratio. This is due to the fact that a connecter 120 between transformers 160 is shared between those transformers 160, such that current going through the converter 100 is forced to pass through two transformers at a time to deliver power, resulting in a 2× boost of the transformer turns ratio.

For a 135V input on the low-voltage side of such a converter, the output on the high-voltage side of the transformer windings will be 891V (i.e., 135V×6.6), which is a high voltage for many applications. If the transformers on the high-voltage side are configured such that when operated in the reverse direction they are no longer in series, but in parallel, the high-voltage side requirements would be cut in half. For example, an input of 445V (i.e., 135V×3.3) would yield a 135V output with the same transformers in parallel. Thus, instead of an 891V input, a more reasonable 445V input would result in a low side output in the desired range. As is evident, no boost to get the input voltage up to 891V would be needed for a converter with this configuration. The highest voltage needed for achieving a 150V output would be 495V (i.e., 150V×3.3). This would also allow an even higher boost ratio on the transformers to be used without sending the high-voltage side up too high during reverse direction conversions.

Alternately, if an even lower boost ratio were to be used, the need to boost the high-voltage side in reverse direction could be eliminated.

Figure 2:
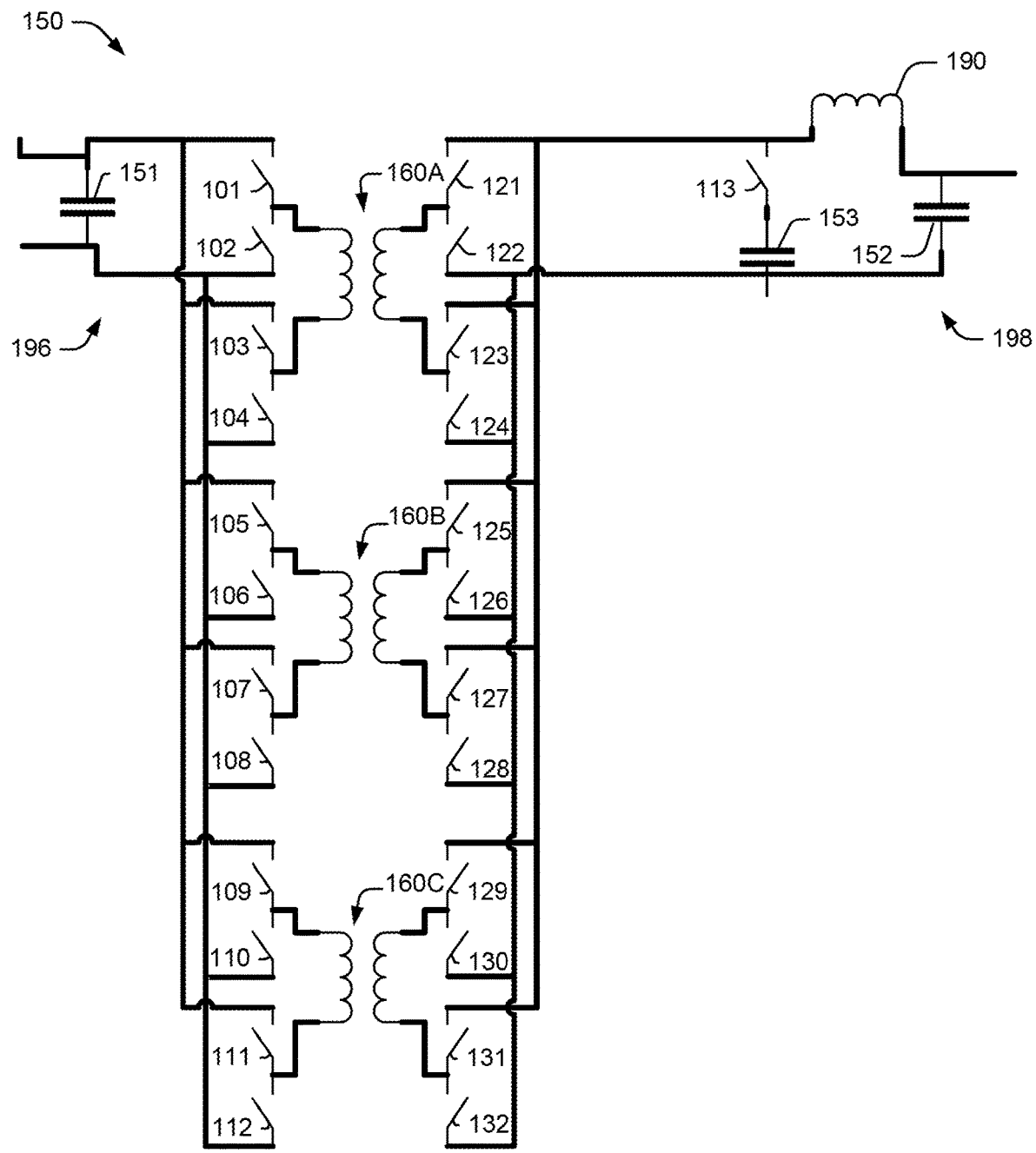
FIG. 2 is a circuit diagram showing a prior art converter having a 3-phase interleaved in which there is no shared connection between transformers to allow series connection.

In FIG. 2 (prior art), a converter 150 with a strict 3-phase interleaved transformer configuration is shown. This transformer configuration forms a full-bridge synchronous rectifier that is shared across each phase for directing energy for situations in which the high boost ratio is not needed, but power is. The 3-phase interleaved transformer configuration can be realized in the reverse direction as well as forward, which is useful in situations where a delta-wye configuration is detrimental to performance requirements. In this configuration, the high voltage side 198 includes pairs of switches (e.g., 121-122, 123-124, 125-126, 127-128, 129-130, and 131-132) that are located between each end of each transformer 160 (e.g., 160A-160C) and high voltage side 198.

For a 10 KW power supply, for example, all three transformers 160 (i.e., 160A-160C) may be utilized at full capacity with a 120-degree phase shift. In this configuration, there is no shared connection between transformers 160 to allow the transformers to be connected in series, which still allows full sharing of power between all the transformers. The schematic topology is different on the high voltage side 198, which uses switches (e.g., 121-122, 123-124, 125-126, 127-128, 129-130, and 131-132) to create "full bridge" rectifiers. A drawback with this configuration is that boost capability is cut in half and it cannot be used for range extension.

Figure 3:
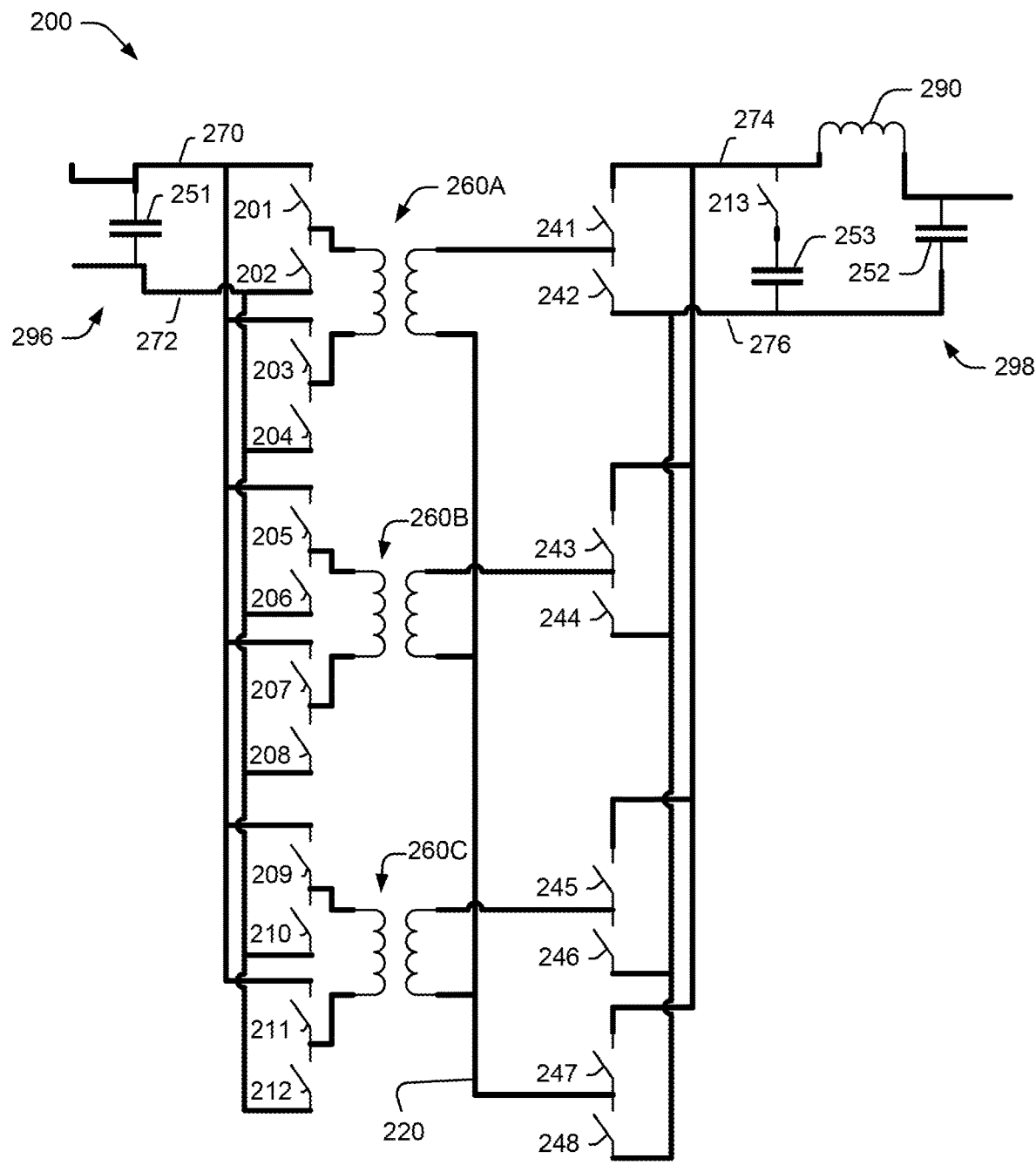
FIG. 3 is a circuit diagram showing a hybrid bidirectional DC to DC converter in accordance with an embodiment of the present invention.

A hybrid bidirectional DC to DC converter, such as converter 200, a schematic configuration of which is shown in FIG. 3, can be utilized both for delta-wye configuration transforms and to select a direct boost ratio in the high voltage to low voltage direction (but not necessarily in the low voltage to high voltage direction). This hybrid bidirectional converter 200 increases the input voltage that can be accepted on the high voltage sides of the transformers, and therefore the voltage rating of a device incorporating the hybrid bidirectional converter.

In this hybrid converter, switches are used to tie the commons of the transformers to ground and power rail when appropriate to form a full-bridge with the remaining phases so that transformers do not have to be connected in series in the high voltage to low voltage direction.

In operation, in the forward direction a typical operation may be to take variable low voltage input and boost it to a high Voltage output, such as boosting a 60-135 VDC to 450 VDC.

In the reverse or buck mode, the input voltage for some applications is 350-450 VDC and needs to be reduced to 200-400 VDC, in which case the desired reduction ratio is usually less than 5:1. In the buck/reverse mode, the high ratio is generally not needed until the input voltage drops below 80 VDC. In other applications, the threshold input voltage will be selected as appropriate, and may be, for example, between 10V and 500V.

As shown in FIG. 3, hybrid bidirectional DC to DC converter 200 has a high voltage side 298 and a low voltage side 296 that are separated by a plurality of transformers 260 (e.g., 260A-260C). Low voltage side 296 includes a capacitor 251 as well as a first line 270 connecting a first side of capacitor 251 to each end of each transformer 260 and a second line 272 connecting a second side of capacitor 251 to each other end of each transformer 260. Switches (e.g., 201, 203, 205, 207, 209, 211) are located between each end of each transformer 260 and first line 270 and another set of switches (e.g., 202, 204, 206, 208, 210, 212) are located between each other end of each transformer 260 and second line 272. On high voltage side 298, a first capacitor 252 and a second capacitor 253 is located between a third line 274 and a fourth line 276. An inductor 290 is on third line 274 between capacitor 252 and capacitor 253, and a switch 213 separates capacitor 253 from third line 274. Switches (e.g., 241, 243, 245) are located along third line 274 and connect to respective ends of transformers 260. Another set of switches (e.g., 242, 244, 246) are located along fourth line 276 and connect to the same respective ends of transformers 260. A connector 220 connects to the other ends of each of transformers 260 and to third line 274 via a first field effect transistor (FET) switch 247 and to fourth line 276 via a second FET switch 248.

In this hybrid dynamic topology switching design, the two additional FET switches (i.e., switches 247 and 248 in FIG. 3, which may be any suitable switches) are utilized to alter the series nature of transformer secondary windings in a multi-phase delta-wye configuration into a parallel nature that allows a dynamic switchover from 2× boost of winding ratio to a 1× boost when high boost is not required. Switches 247 and 248 are used to tie commons (i.e., connector 220) of transformers 260 to ground and power rail. This forms a full-bridge with the remaining phases so that transformers 260 do not have to remain connected in series in the high voltage to low voltage direction.

It will be understood that the above described hybrid converter may be used for applications requiring any boost ratio, such as 1:1.5 to 1:10 or greater.

Figure 4:
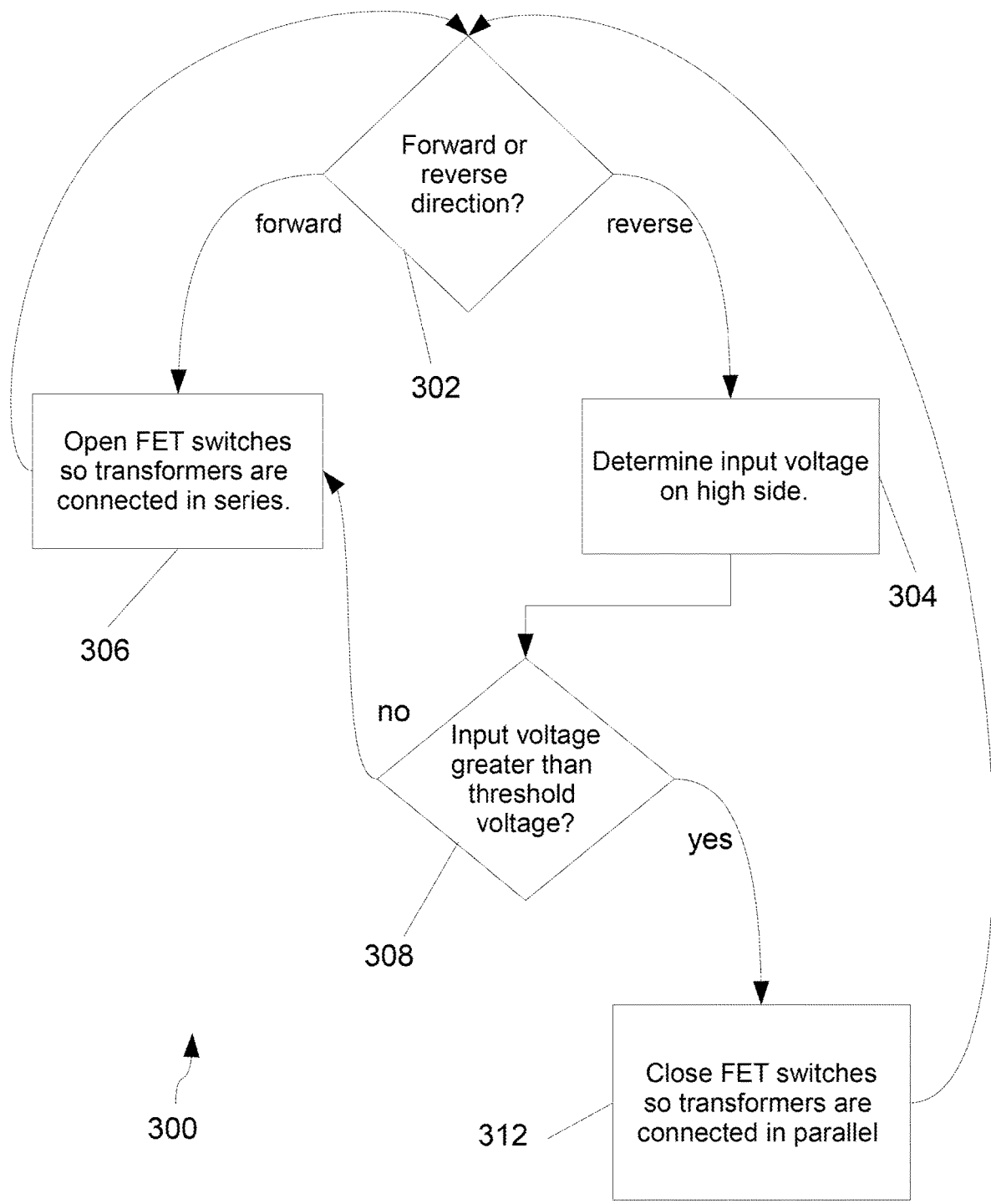
FIG. 4 is a process diagram of a method for providing an adjustable boost ratio for a DC to DC converter in accordance with an embodiment of the present invention.

A process 300 for providing an adjustable boost ratio in a hybrid bidirectional DC to DC converter is outlined in FIG. 4. It is first determined whether the converter is operating in the forward or reverse direction at step 302. When operating in the reverse, the input voltage on the high voltage side is detected or sensed at step 304, and a comparison of that determined input voltage to a preset threshold voltage is made at step 308. When the detected high side input voltage is above the threshold level, the switches are closed (at step 312) and the transformers will be connected in parallel, resulting in a smaller reduction ratio. When operating in the forward, boost direction, or if the detected high side input voltage is below the threshold level, the switches are opened at step 306 and the transformers are connected in series so that the high boost ratio is achieved.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A hybrid bidirectional DC to DC converter having a high voltage to low voltage direction and a low voltage to high voltage direction, the converter comprising:

a plurality of transformers, each of the plurality of transformers having a secondary winding;

a plurality of switches, wherein one of the plurality of switches is between a respective one of each of the plurality of transformers and a low voltage side of the converter and wherein another one of the plurality of switches is between a respective one of each of the plurality of transformers and a high voltage side of the converter; and at least two additional switches on a connection shared by the plurality of transformers, the two additional switches configured to allow a dynamic changeover of a plurality of secondary windings in a multi-phase delta-wye configuration from a series nature into a parallel nature such that a 2× boost of winding ratio is reduced to a 1× boost of winding ratio.

2. The DC to DC converter of claim 1, wherein the additional switches tie a commons of the plurality of transformers to ground and a power rail to form a full-bridge with remaining phases when closed.

3. The DC to DC converter of claim 2, wherein the two additional switches are closed when the converter is operating in the high voltage to low voltage direction and a detected input voltage on the high voltage side of the converter is below a threshold input voltage.

4. The DC to DC converter of claim 3, wherein the two additional switches are open when the detected input voltage on the high voltage side of the converter is above the threshold input voltage.

5. The DC to DC converter of claim 1, wherein the two additional switches are open when the converter is operating in the low voltage to high voltage direction.

6. The DC to DC converter of claim 1, wherein the plurality of transformers includes three transformers and wherein each of the three transformers has a boost ratio of between 1:1.5 and 1:10.

7. The DC to DC converter of claim 3, wherein the threshold input voltage is between 10 VDC and 450 VDC.

8. The DC to DC converter of claim 7, wherein the threshold input voltage is between 50 VDC and 150 VDC.

9. The DC to DC converter of claim 1, wherein the two additional switches are field effect transistor switches.

10. A method for adjusting a boost ratio across a bidirectional DC to DC converter having a high voltage to low voltage direction and a low voltage to high voltage direction comprising:

determining whether the converter is operating in a forward direction or in a reverse direction; and when the converter is operating in the forward direction:
opening a pair of field effect transistor (FET) switches, wherein the pair of FET switches tie a commons of a plurality of transformers in the converter to ground and a power rail to form a full-bridge with remaining phases when closed; and when the converter is operating in the reverse direction:
determining an input voltage on a high side of the converter;
comparing the determined input voltage to a threshold input voltage;
closing the pair of FET switches when the determined input voltage is greater than the threshold input voltage; and
opening the pair of FET switches when the determined input voltage is less than the threshold input voltage.

11. The method of claim 10, wherein the threshold input voltage is 80 VDC.

12. The method of claim 10, wherein closing the pair of FET switches causes a dynamic changeover of a plurality of secondary windings in a multi-phase delta-wye configuration from a series nature into a parallel nature such that a 2× boost of winding ratio is reduced to a 1× boost of winding ratio.

* * * * *